United States Patent [19]
Eder

[11] Patent Number: 4,484,074
[45] Date of Patent: Nov. 20, 1984

[54] PLANAR DETECTOR OF A DEVICE FOR DETECTING CORPUSCULAR OR ELECTROMAGNETIC RADIATION, AND METHOD FOR MANUFACTURING SAME

[76] Inventor: Franz X. Eder, Halmstr. 15a, 8000 München 25, Fed. Rep. of Germany

[21] Appl. No.: 482,012

[22] Filed: Apr. 8, 1983

Related U.S. Application Data

[63] Continuation of Ser. No. 162,410, Jun. 24, 1980.

[30] Foreign Application Priority Data

Jul. 31, 1979 [DE] Fed. Rep. of Germany ....... 2931096

[51] Int. Cl.$^3$ .......................... G01T 1/00; G02F 1/09; G11C 11/44
[52] U.S. Cl. ................................ 250/336.1; 250/332; 250/352; 350/355; 350/361
[58] Field of Search ................ 250/336.1, 330, 332, 250/394, 395, 352, 338; 350/355, 361, 356, 359, 375–378

[56] References Cited

U.S. PATENT DOCUMENTS

| | | | |
|---|---|---|---|
| 3,105,906 | 10/1963 | Schultz et al. ...................... | 250/352 |
| 3,180,989 | 4/1965 | Hand, Jr. et al. .................... | 250/352 |
| 3,413,055 | 11/1968 | De Sorbo ............................ | 350/377 |
| 3,435,137 | 3/1969 | Altshuler et al. .................... | 250/352 |
| 3,529,164 | 9/1970 | Komatsubara et al. ............. | 250/352 |
| 3,588,223 | 6/1971 | Watson ................................ | 350/377 |
| 3,650,601 | 3/1972 | Bierlein ................................ | 350/355 |
| 4,135,091 | 1/1979 | Lanza et al. ......................... | 250/336 |
| 4,149,075 | 4/1979 | Drukier et al. ...................... | 250/336 |

OTHER PUBLICATIONS

"Technique Makes Superconductivity Visible", Electronics, vol. 33, Jul. 22, 1960, pp. 76–78.
Alers, "Structure of the Intermediate State in Superconducting Lead", Phys. Rev., 105 (1), Jan. 1, 1957, pp. 104–108.
Ahn, "Increase in Faraday Rotation in Magneto-Optic Films", IBM Tech. Discl. Bull., 14 (7), Dec. 1971, p. 2222.
Wieder, "Multilayer Magneto-Optic Structure", IBM Tech. Discl. Bull., 15 (6), Nov. 1972, p. 1792.

Primary Examiner—Alfred E. Smith
Assistant Examiner—Carolyn E. Fields
Attorney, Agent, or Firm—Kenyon & Kenyon

[57] ABSTRACT

A planar detector of a device for detecting corpuscular or electromagnetic radiation, utilizing the magnetic superheating properties of small superconducting particles in a magnetic field has its receiving surface subdivided into small superconducting detector elements of equal size and placed on a transparent body of a magneto-optically active material. The elements are illuminated from the rear with monochromatic, linearly polarized light, and can be observed via a crossed polarization filter to provide a radiation receiver of relatively simple design and high resolution.

9 Claims, 4 Drawing Figures

PLANAR DETECTOR OF A DEVICE FOR DETECTING CORPUSCULAR OR ELECTROMAGNETIC RADIATION, AND METHOD FOR MANUFACTURING SAME

This application is a continuation of application Ser. No. 162,410, filed June 24, 1980.

BACKGROUND OF THE INVENTION

The invention relates to a planar detector of a device for detecting corpuscular or electromagnetic radiation, utilizing the magnetic superheating properties of small superconducting particles in a magnetic field, with a device for optical registration of the irradiated particles. The invention further relates to a method for manufacturing the planar detector. A similar planar detector is known, for instance, from U.S. Pat. No. 4,149,075.

In medical and physical applications, viewing screens of luminescent crystal layers or image converters with photo cathodes are presently in use for viewing X-ray, diffraction or structure pictures. For the objective reproduction of images which are obtained by central projection by an X-ray tube or as a diffraction image with monochromatic electron radiation, photographic film still plays a dominant role. The properties of these detection means can be subdivided as follows: (a) sensitivity, i.e., the areal intensity just detectable and visible, referred to the incident primary energy; (b) the time resolution of the detection method, which is of importance for following up dynamic processes. For some applications, it is also important that the detector is able to discriminate or sum up the incident radiation as to its energy.

Recently, special properties of superconducting spherical granulates have been used to detect corpuscular or electromagnetic radiation. For this purpose, what is known as the magnetic superheating effect has been utilized. This effect is based on the fact that a smooth superconducting body retains its superconducting properties even if an external magnetic field which is stronger than the equilibrium field acts on it.

This superheating effect will be explained in the following, referring to FIG. 1 of the drawing. In the diagram of the figure, magnetic induction $B_c$ is plotted in arbitrary units for a superconductive material versus the temperature T, above which superconductivity is no longer possible. The phase boundary between superconductivity and normal conduction is shown by a solid line. In the vicinity of the transition point $T_c$, the magnetic induction is relatively small; the maximum value $B_c(0)$, reached at $T=0$, is between 15 and 60 mT for known superconductive materials such as tin, lead or mercury.

The effect used in superconducting bolometers on the basis of this relationship for detecting very low radiation intensities is based on a constant temperature $T_1$ and a magnetic induction $B_{c1}$ just below the phase boundary between superconductivity and normal conduction. Due to the absorption of corpuscular or electromagnetic radiation within a given time interval $\Delta t$, the superconducting detector element, for instance, a small sphere of volume V receives the energy $\Delta E$, whereby its temperature is increased by the amount $\Delta T = \Delta E / V \cdot \rho \cdot c$, where $\rho$ and c are the density and the specific heat of the material, respectively. Since in the temperature range of interest, 2 to 3.5 K., the specific heat c is very small because of Debye's $T^3$ law and also the volume V can be chosen extremely small, a temperature increase of $\Delta T = 0.2$ K. can be produced even with amounts of absorbed energy on the order of $\Delta E = 10^{-10}$ J; these temperature increases are fully sufficient for a transition to the normal conducting phase.

Very small superconducting volumes with a smooth surface, which are a prerequisite for high geometric resolution in the subject of the present invention, have the property of changing into the normal conducting state, with the temperature $T_1$ held constant, not at the induction $B_{c1}$ but not before a value $B_{sh1}$, as can be seen from FIG. 1, since the relatively large surface energy, referred to the very small volume, for the present prevents the occurrence of normal conduction. This magnetic induction depending on the type of the superconductor and its geometric dimensions is designated as the superheating induction $B_{sh}$, which can be 20 to 100% higher than the value of $B_c$. While the phase transition from a point 1 to a point 2 shown in FIG. 1 is in principle reversible and both states can be obtained by positive or negative temperature changes $\Delta T$, a state designated with 3 is metastable; i.e., once a normal conducting state 4 situated beyond a phase boundary illustrated in FIG. 1 by a dashed line is reached by a small temperature increase, the magnetic induction must be lowered far below $B_{c1}$ in order for the detector element to recover the superconducting state.

The degree of superheating is designated as $p=(B_a-B_c)/B_c$, where $B_a$ means the applied field and $B_c$, the thermodynamic field. The temperature increase to be applied for transition to normal conduction can be given theoretically as $$\Delta T = \frac{B_{sh}(T) - B_a}{-\partial B_{sh}(T)/\partial T},$$

where the denominator gives the slope of the $B_{sh}/T$ curve. By suitable choice of the applied field $B_a$, the temperature increase $\Delta T$ required for the phase transition can be predetermined, which makes discrimination as to the energy possible because $\Delta T \sim \Delta E$.

These physical facts, known per se, permit the design of a sensitive planar detector if it is possible to indicate for each small superconducting element whether it is in the superconducting or normal conducting state.

Matrix-like detection arrangements are known, in which the superconducting state of a discrete element is ascertained by its diamagnetic behavior, i.e., a magnetic field produced above the detector element by a thin, current carrying wire is displaced if it is superconducting, and delivers a corresponding signal in what is referred to as a read line.

In another method, the planar detector is scanned after the exposure phase by a thin electron beam in raster fashion, whereby each unexposed element is transferred to the normal conducting state. The flipping process is detected by pickup coils comprising one or more smaller sub areas by coordinating and recording each subsignal synchronously with the scanning, i.e., erasing, beam in video equipment, and producing a negative image in this manner. Both recording methods are rather complicated and require extensive shielding measures.

A device known from U.S. Pat. No. 4,149,075 for determining hard radiation, the energy of which is larger than 5 keV, consists of a probe element with individual detector areas which contain free grains of a superconductive material of the first kind and are in a metastable superconducting state in an external magnetic field. As soon as radiation impinges on these grains, they change into the normal conducting state. In this device, the effect of external forces attacking at the grains the transition from the superconducting to the normal conducting state is utilized. Because of this transition, the grains change their position within the specimen upon such a transition under the action, for instance, of the Earth's gravity. In the known device, this geometric change can be determined optically. To this end, the device contains a Stanhope magnifier, which terminates the probe element on its side facing away from the incident radiation (see FIG. 10a). The grains changed to the normal conducting state can be observed in this magnifier as shiny sharp dots, while the remaining superconducting grains are immersed in the optical background.

However, the construction of such a probe element is relatively expensive, as they must comprise a multiplicity of very fine canal-like areas, in each of which one or more superconducting grains are freely arranged. Suitable structures, however, especially with very small cross sections of their canals, can be made only with difficulty. Because of the lower limit of the canal cross sections due to the manufacturing technique, the resolution of the known device for determining hard radiation is accordingly limited. In addition, the distribution only of those elementary rays, the energy of which is relatively large and is above a predetermined threshold, can be determined with the known device. This threshold is furthermore dependent on the size of the individual granules.

It is an object of the present invention to simplify and improve the planar detector known from U.S. Pat. No. 4,149,075 in such a manner that relatively low energy radiation can also be detected with simultaneously relatively high resolution.

SUMMARY OF THE INVENTION

According to the present invention, this problem is solved, for a planar detector of the type mentioned, by subdividing the receiving area of the detector into small metallic superconducting detector elements of approximately equal size which are placed on a transparent layer of a material with magneto-optical behavior, and illuminating the receiving area, rastered in this manner, from the rear, with a monochromatic, linearly polarized light beam which can be visually observed, photographed or otherwise recorded via a crossed polarization filter.

The advantages of this embodiment of the planar detector are, in particular, that its receiving area can be provided in a relatively simple manner with a very small mesh raster of detector elements. The resolution is accordingly high. In addition, the device for optically registering the detector elements which have changed from the superconducting to the normal conducting state due to exposure to radiation is relatively simple and sufficiently sensitive.

According to a method for manufacturing the planar detector of the present invention, a layer of superconductive material is advantageously applied to a body of magneto-optically active material, and subsequently, at least the superconductive layer is subdivided into, for instance, square raster elements of approximately equal size, regularly distributed over the receiver area, as active, superconducting detector elements.

DETAILED DESCRIPTION OF THE INVENTION

Figure 1:
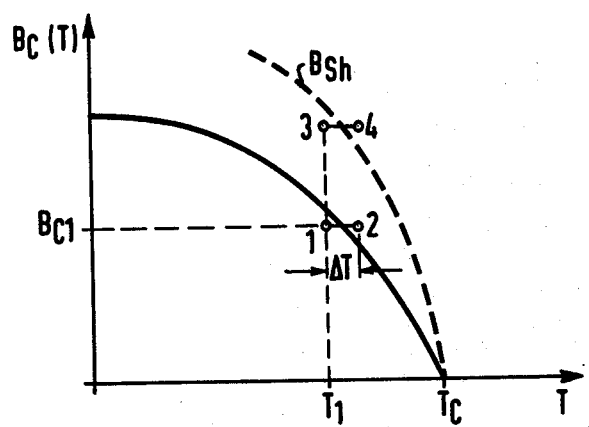
FIG. 1 is a curve illustrating the basic principle used in the present invention.
Figure 2:
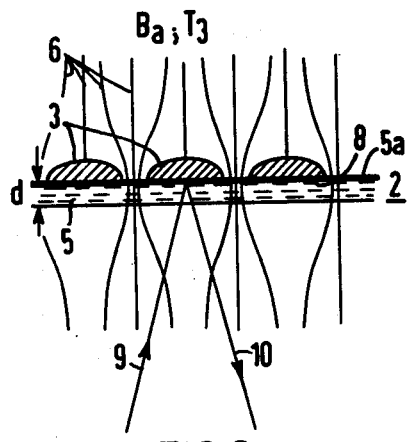
FIGS. 2 and 3 are schematic illustrations of a planar detector according to the present invention.
Figure 3:
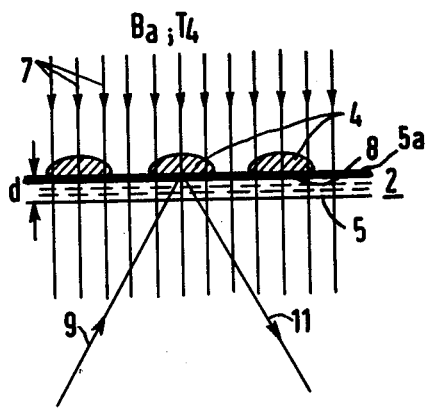

The principle of the subject of the present invention is shown in a simplified form in the planar detector 2 depicted in a cross section in FIGS. 2 and 3. The receiving surface of the detector is subdivided into very small areas of, say, $10^{-4}$ cm$^2$ and consists of circular or also square super-conductive granules 3 and 4 of tin, lead, aluminum or indium. These granules are placed as a raster on the flat top side of an insulating transparent body 5, for instance, a sheet or plate, which is to have uniform thickness d. Since the granules serving as detector element 3, when in the superconducting state, i.e., at a constant temperature $T_3$ and an induction $B_{sh}$ lying below the phase boundary according to FIG. 1 displace a magnetic flux generated by a homogeneous external field $B_a$, the pattern of flux lines 6 shown in FIG. 2 is obtained. Below each detector elements 3, on the other hand, the field strength of the external field will be very small, for instance, near zero.

If, on the other hand, the detector elements 4 have changed, due to the incidence of energy of a corpuscular or electromagnetic radiation, to the normal-conducting state, the detector elements then being at a temperature $T_4$, the external field $B_a$ penetrates these elements in the manner indicated in FIG. 3 by the lines 7 with arrows. The external field can therefore be detected underneath the detector elements 4 exposed to the radiation in the transparent plate 5 and below the plate.

For simultaneously detecting the magnetic field on the underside of the exposed detector elements 4, the effect, known per se, of the rotation of the plane of polarization of light in a magnetically active material is utilized, according to the present invention. This magnetic Faraday effect causes a rotation of the plane of polarization of linearly polarized, monochromatic light which is proportional to the permeated thickness, a material constant known as the Verdet constant, and to the square of the magnetic induction. This renders possible the observation method using reflected light indicated in FIGS. 2 and 3, where the light beam 9 incident on the underside 8 of the detector elements 3 or 4 is reflected, penetrates the optically active zone of the layer 5 twice and leaves the latter as the light beam 10 or 11, respectively. According to the example according to FIG. 3, the light beam 11 is rotated in its plane of polarization by the field $B_a$ present in the plate 5. The reflecting undersides 8 of the detector elements 3 and 4 should have reflectivity at most in the visible range, so that no undesirable temperature rise can be caused by absorption in the visible range by the optical detection of the magnetic flux penetration or displacement. Optionally, a thin, highly reflective intermediate layer 5a can therefore be provided between the individual detector elements 3 and 4 and the magneto-optically active plate 5.

For detecting the rotation of the plane of polarization, an analyzer, not shown in FIGS. 2 and 3, for instance, in the form of a polarization filter, is used in the reflected light beam; in the state of the detector elements 3 shown in FIG. 2, the polarizer and the analyzer are rotated 90° relative to each other, whereby the reflected beam 10 appears dark. In the case of the exposed detector elements 4 according to FIG. 3, the detector elements appear brightened in the field of view of the analyzer and furnish a planar image of the radiation distribution.

Vapor-deposited layers of europium sulfide (EuS) and/or europium fluoride (EuF$_2$), the Verdet constant of which is relatively large and increases at low temperatures with 1/T can be used to to advantage as the optically active material. In practice, layer thicknesses of a few micrometers are sufficient. Since the geometric resolution is comparable to the film thickness, the former is in the order of 5 micrometers or less. For reasons of mechanical stability, the layers can be applied to a transparent substrate. For coarser structures, cerium phosphate glasses, for instance, 0.5 mm thick are also suitable.

The planar detector 2 can advantageously be made by vapor-depositing on a substrate of the magneto-optically active material such as EuS and EuF$_2$ a layer of the superconductive material such as Al and by subsequently subdividing at least the superconducting layer into approximately square raster elements by mechanical means or, in particular, dividing it into individual detector elements by means of a thin electron beam.

Figure 4:
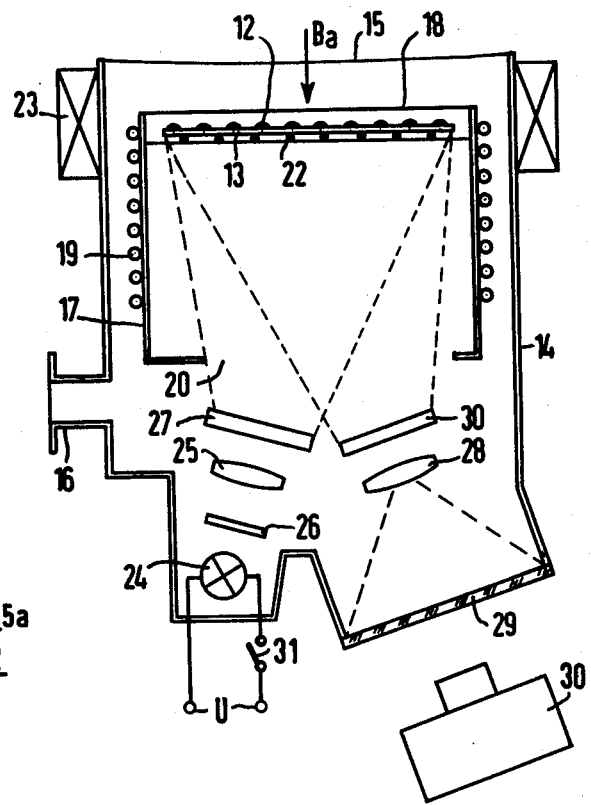
FIG. 4 is a schematic plan view of a radiation receiver with such a planar detector.

In FIG. 4, an embodiment of a radiation receiver according to the present invention is shown in schematic cross section. The receiver contains a raster 12 of detector elements which correspond to the detector elements 3 or 4 according to FIGS. 2 or 3 and consist, for instance, of tin. The raster is applied of a magneto-optically active substrate 13 in the form of a very thin EuS/EuF$_2$ layer and is fastened inside a vacuum chamber 14. The interior of this chamber 14 is closed on the inlet side for the radiation to be detected by a thin plastic film 15 vapor deposited with aluminum and is connected via a suction tube 16 to a high vacuum pump, producing a concave surface of the film 15. Inside the vacuum chamber 14 there is a cylindrical radiation shield 17 of copper which is likewise closed off on the input side of the radiation by an aluminum foil or a plastic film 18 vapor-deposited with aluminum and is kept at a constant temperature between 1.5 and 3.5 K. via a coiled tube 19 through which evaporating helium is drawn. The radiation shield 17 which is also closed off at its end face opposite the radiation except for an observation opening 20, advantageously has interior surfaces with a relatively high emission coefficient and highly reflecting, for instance, silver-coated outside surfaces. The inside surfaces are preferably blackened for this purpose. The detector matrix of the raster 12 and the optically active layer of the substrate 13 are fixed within the radiation shield 17 by a wide-mesh net 22 of nylon or Teflon filaments and obtain its proper temperature through radiation exchange with the radiation shield 17.

By means of a short solenoid 23, which is attached symmetrically to the detector plane at the outside circumference of the vacuum chamber housing 14 and is supplied by an adjustable current, a spatially homogenous magnetic field $B_a$, indicated by an arrow, can be generated perpendicular to the detector plane, which in the receiving phase of the detector matrix must lie just below the superheating field $B_{sh}$ characteristic for its superconductive material, and is lowered considerably for a short time after the exposure, i.e., after the irradiation.

For displaying the magnetic flux distribution at the detector, the underside of the detector matrix 12 is illuminated by a light source 24 and a condenser lens 25 over a large area. A switch 31 is provided to supply a voltage U to the light source 24. The switch may be utilized for switching the light source when the magnetic field is in the supercritical region of the superconductive material of the detector elements. An interference filter 26 and a polarization filter 27, acting as a polarizer, are inserted into the ray path. After reflection of the polarized monochromatic light at the elements of the detector matrix 12, its underside is imaged by an object glass 28 on a screen 29, for instance, a ground glass plate, after the light beam has first passed through a further polarization filter 30, serving as the analyzer for determining the optical rotation. In the superconducting, i.e., unirradiated state of the detector matrix 12, the analyzer 30 is rotated approximately 90° relative to the position of the polarizer 27 and produces a dark image on the screen. After the exposure phase, all sensing elements hit by the radiation are brightened and furnish an accurate image of the incident intensity. The image may then be viewed or recorded, for example, by photographing with camera 30.

After registration of this image, the magnetic field of the solenoid 23 is briefly reduced to the rate that the picture on the screen 29 becomes erased. Subsequently, the imaging process can be repeated.

It can be estimated that a power density of about $10^{-8}$ W/cm$^2$ is necessary to detect, for instance, 50-keV electrons in order to obtain a high contrast image, i.e., that the sensitivity of modern bolometers is reached but, which can measure the intensity only at one point.

The present invention also covers other possible designs of the detector such as, in particular, flat vacuum vessels, in which the illumination and imaging are arranged via a semi-transparent centrally placed mirror and are attached laterally.

The planar detector according to the present invention is suitable not only for detecting high energy corpuscular and gamma radiation but it can also be used for detecting ultraviolet and infrared radiation if the surfaces of the detector elements facing the radiation are coated selectively for the radiation to be detected. In the case of infrared radiation, these areas may, for instance, be blackened.

What is claimed is:

1. In a planar detector of a device for detecting corpuscular or electro-magnetic radiation utilizing the magnetic superheating properties of small, superconductive particles cooled by a cryogenic medium and disposed in a homogeneous magnetic field, with a device for magneto-optical registration of the irradiated particles by detecting the extent of polarization-plane rotation of polarized light passing through a transparent body of magneto-optically active material disposed in a region about the irradiated particles, the improvement comprising the receiving layer of the detector being subdivided into small metallic superconducting detector elements of approximately equal size and having radiation-receiving surfaces with edge lengths no greater than 0.1 mm, said superconducting detector elements being cooled indirectly and being disposed in a vacuum on a transparent magneto-optically active body of a material which rotates the plane of polarization of plane-polarized light in the presence of a magnetic field, the thickness of said transparent body being less than the edge length of said superconducting detector elements; means for illuminating the superconducting detector elements from the rear with a monochromatic, linearly polarized light beam, said super-conducting detector elements being provided at the rear with contact surfaces engaging said transparent body, said contact surfaces being highly reflective to said monochromatic, linearly polarized light beam; and means for visually observing, photographing or otherwise recording light reflected from said contact surfaces via a crossed polarization filter.

2. The improvement according to claim 1, wherein said magneto-optically active body comprises a layer of material selected from the group consisting of europium sulfide and europium fluoride.

3. The improvement according to claim 2, wherein said magneto-optically active layer is applied to a transparent substrate.

4. The improvement according to claim 1, wherein said magneto-optically active body comprises cerium phosphate glass.

5. The improvement according to claim 1 wherein said detector elements are selected from the metallic group consisting of aluminum, tin, lead and indium.

6. The improvement according to claim 1 and further including a thin intermediate layer which will strongly reflect the monochromatic polarized light arranged between the super-conducting detector elements and said magneto-optically active body.

7. The improvement according to claim 1 wherein the receiver surface of the detector is contained in an internally blackened radiation protection vessel which is deep-cooled to the operating temperature of the superconducting detector elements and is closed except for the observation openings, is silvered on the outside or is provided with an otherwise strongly reflecting surface, and is contained in a high-vacuum housing.

8. The improvement according to claim 1 and further including means for switching the light source used for observing the detector image on only if the magnetic field is in the supercritical region of the superconductive material of the detector elements.

9. In a planar detector of a device for detecting corpuscular or electro-magnetic radiation utilizing the magnetic superheating properties of small superconductive particles cooled by a cryogenic medium and disposed in a homogeneous magnetic field with a device for magneto-optical registration of the irradiated particles, an improved method of obtaining an image comprising:
 (a) disposing a layer of metallic superconducting material on a transparent body of a material which rotates the plane of polarization of plane-polarized light in the presence of a magnetic field;
 (b) subdividing said layer into small superconducting detector elements of approximately equal size and having radiation-receiving surfaces with edge lengths no greater than 0.1 mm, the thickness of said transparent body being less than the edge lengths of said superconducting detector elements;
 (c) providing said superconducting detector elements with contact surfaces engaging said transparent body, said contact surfaces being highly reflective to monochromatic, linearly polarized light;
 (d) disposing said superconducting detector elements on said transparent body in a vacuum and indirectly cooling said superconducting detector elements with a cryogenic medium;
 (e) irradiating said layer from the front;
 (f) illuminating said layer from the rear with said monochromatic, linearly polarized light; and
 (g) observing said layer through a crossed polarization filter.

* * * * *